Figure 1:
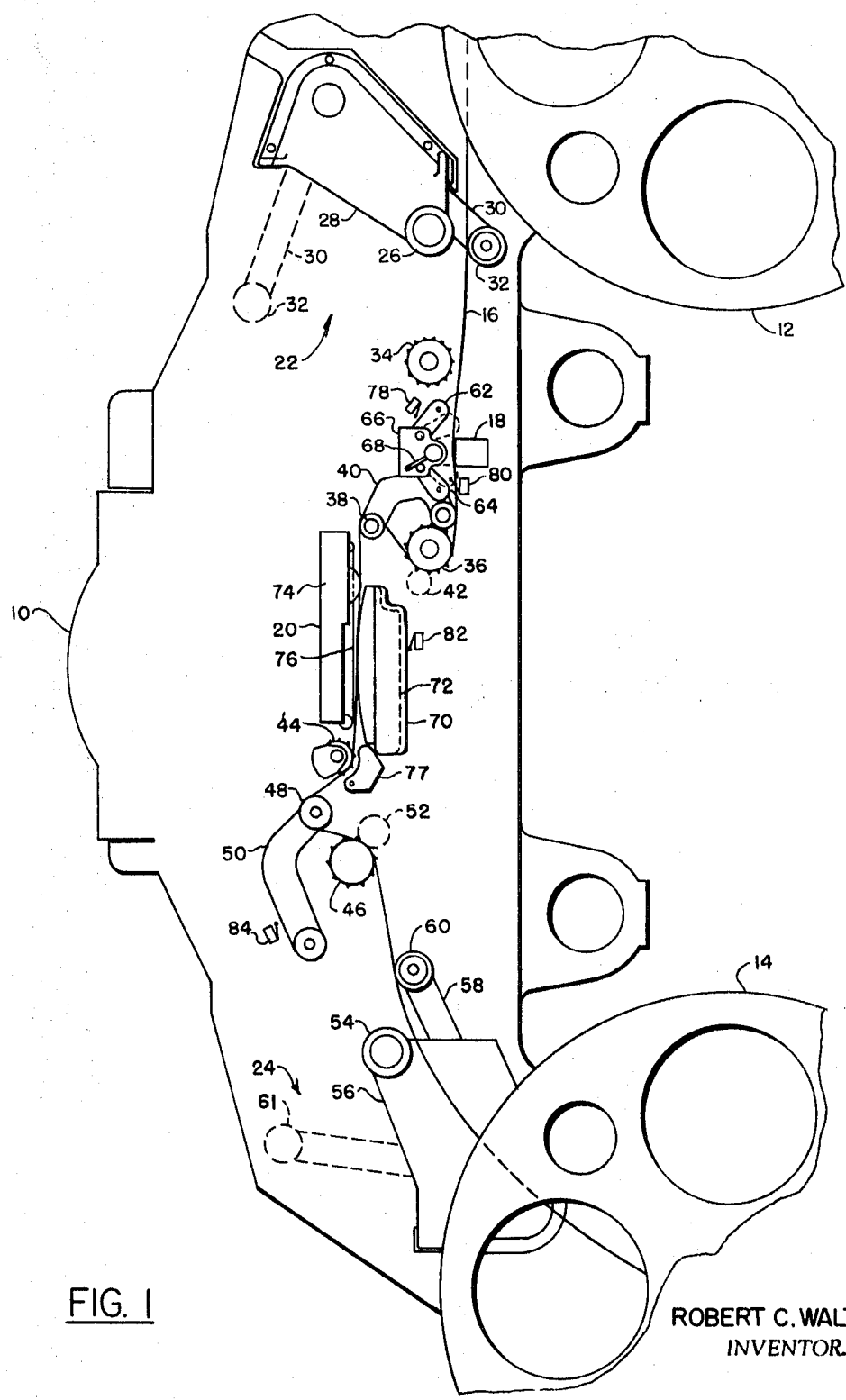

United States Patent

[11] 3,583,799

| [72] | Inventor | Robert Charles Walter<br>Binghamton, N.Y. |
|---|---|---|
| [21] | Appl. No. | 757,577 |
| [22] | Filed | Sept. 5, 1968 |
| [45] | Patented | June 8, 1971 |
| [73] | Assignee | Singer-General Precision, Inc. |

[54] MOTION PICTURE PROJECTOR
5 Claims, 4 Drawing Figs.

[52] U.S. Cl. .................................................. 352/166,
352/176
[51] Int. Cl. .................................................. G03b 1/54
[50] Field of Search ....................................... 352/166,
174, 176, 155, 14, 157; 226/89, 90, 91

[56] References Cited
UNITED STATES PATENTS

| 2,010,559 | 8/1935 | Nichols | 352/155 |
| 2,566,187 | 8/1951 | Giuffrida | 352/155 |
| 2,624,813 | 1/1953 | Giuffrida | 352/155 |
| 3,224,828 | 12/1965 | Chytil | 352/157 |

Primary Examiner—Louis R. Prince
Assistant Examiner—Denis E. Corr
Attorneys—Francis L. Masselle, William Grobman and Andrew G. Pullos ABSTRACT: The disclosed embodiment of the present invention is a motion picture projector which includes a simplified threading and loading apparatus and several novel failsafe devices. The projector is provided with a film trap gate, a plurality of sprockets for forming loops in the film on opposite sides of the gate, and tensioning means on opposite sides of the gate for maintaining a predetermined tension in the film strip. The tensioning means are moveable to a "load" position with respect to the associated sprockets on opposite sides of the gate to form a substantially straight line path between an associated reel and the sprocket adjacent the film trap gate to permit simplified loading and threading of the film on the projector. In addition, several failsafe switches are provided which maintain the drive system of the projector inoperative until all of the sprockets, pressure rollers, and film trap gate are in the operating position. Each of the reels are provided with a tensioning motor associated with the tensioning means and are further provided with brakes which engage the reel shafts upon the occurrence of a power failure or in the event that one of the interlock switches is actuated.

ROBERT C. WALTER
INVENTOR.

HIS ATTORNEY

ROBERT C. WALTER
INVENTOR.

ROBERT C. WALTER
INVENTOR.

BY
HIS ATTORNEY

MOTION PICTURE PROJECTOR

This invention relates generally to a motion picture projector and more particularly to a simplified threading and loading apparatus and novel failsafe devices for a motion picture projector.

The loading and threading operation of presently known motion picture projectors, particularly those handling relatively wide filmstrips, for example, 70 mm. film is relatively complicated, requiring highly trained operators. Although simplified loading and threading arrangements have been devised for the smaller, or so-called "home" projectors, such simplicity has not been attained in the loading and threading arrangements for larger projectors. One of the primary factors involved in the design of the loading and threading apparatus is that of vibrations which develop in the filmstrip during translation of the strip through the film trap gate and on the sprockets. These vibrations are especially critical in the region of the sound track readhead, since any undesired vibrations will tend to distort the sensed signal.

Although automatic loading in the threading apparatus have been devised for the smaller projectors, such automatic devices have not been feasible for the larger projectors due primarily to the cost involved.

If the presently known projectors are operated by a semiskilled operator, a high probability exists of an error being made. If such an error is made in the loading and threading operation of a projector, it is extremely likely that a portion of the film will be damaged. For example, it is possible to destroy the film if a loop is not formed on opposite sides of the film trap gate. Since it is necessary to actuate some of the elements in the threading and loading apparatus to a "load" position to permit threading of the film on the sprockets and through the film trap gate, it is possible to initiate operation of the projector before such elements are returned to their "operate" position. Under such conditions, the film will be damaged unless some type of failsafe device is employed.

Another problem encountered in the operation of motion picture projectors is that of properly framing the film in the film trap gate such that the film will be properly framed upon initiation of the operation. Many of the smaller projectors are provided with a framing adjustment control and the framing adjustment is performed after the operation of the projector has been initiated. In the larger projectors, the operator manually rotates the film drive mechanism until the shutter is properly positioned before positioning the film in the film trap gate. This framing operation requires a considerable amount of time and demands the use of a highly trained operator.

Accordingly, it is an object of the present invention to provide a motion picture projector with a simplified loading and threading arrangement.

Another object of the present invention is to provide a motion picture projector which can be operated by a semiskilled operator.

Still another object of the present invention is to provide a motion picture projector which is not susceptible to causing film damage due to operator error.

It is still another object of the present invention to provide a motion picture projector which permits relatively simplified framing of the film in the film trap gate.

A feature of the present invention resides in the provision of loading and threading apparatus which form a relatively straight path for loading and threading the film between the feels and the sprockets immediately adjacent the film trap gate.

Another feature of the present invention resides in the provision of a plurality of failsafe switches which maintain the film drive system disengaged until all of the elements of the threading and loading apparatus are properly positioned for initiating operation of the projector.

Still another feature of the present invention resides in the provision of an automatic film drive and shutter positioning mechanism which permits proper framing of the film prior to initiation of the operation thereof.

The motion picture projector constructed in accordance with the principles of the present invention provides the distinct advantages of being relatively simple to operate and relatively free from film damage due to operator errors.

These and other objects, features and advantages of the present invention will be more fully realized and understood from the following detailed description when taken in conjunction with the accompanying drawings wherein:

FIG. 1 is an elevational view, partially broken away and with several nonessential elements not shown, of the projector constructed in accordance with the principles of the present invention.

FIG. is a perspective view of the tension control means employed in the projector illustrated in FIG. 1.

Figure 3:
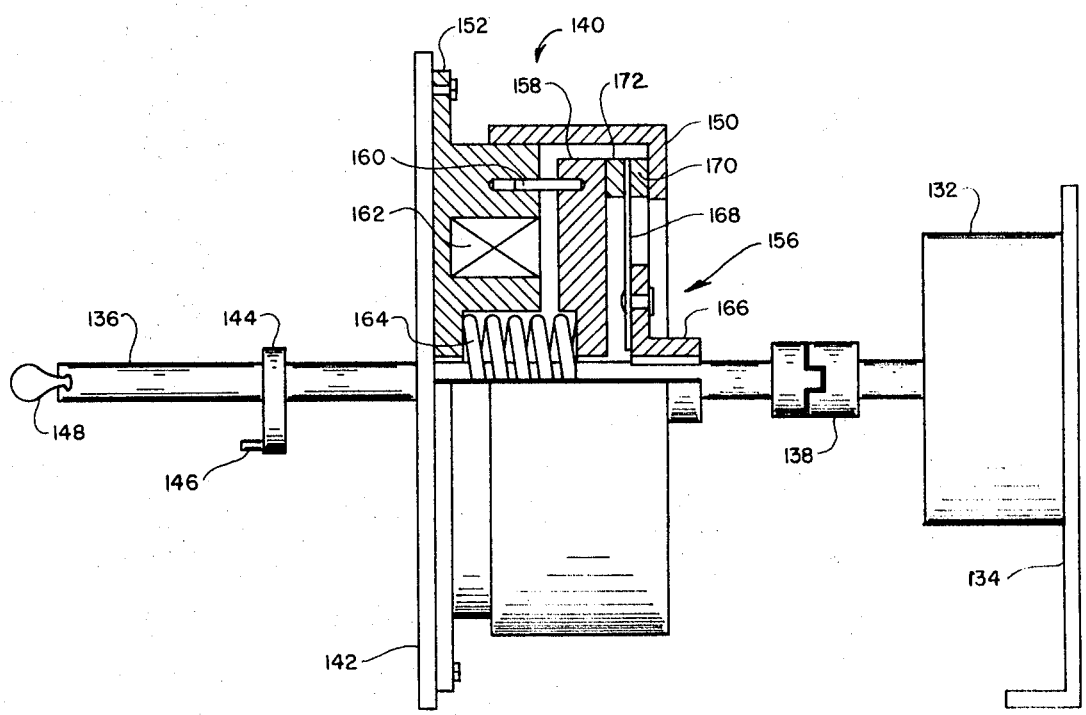
Figure 4:
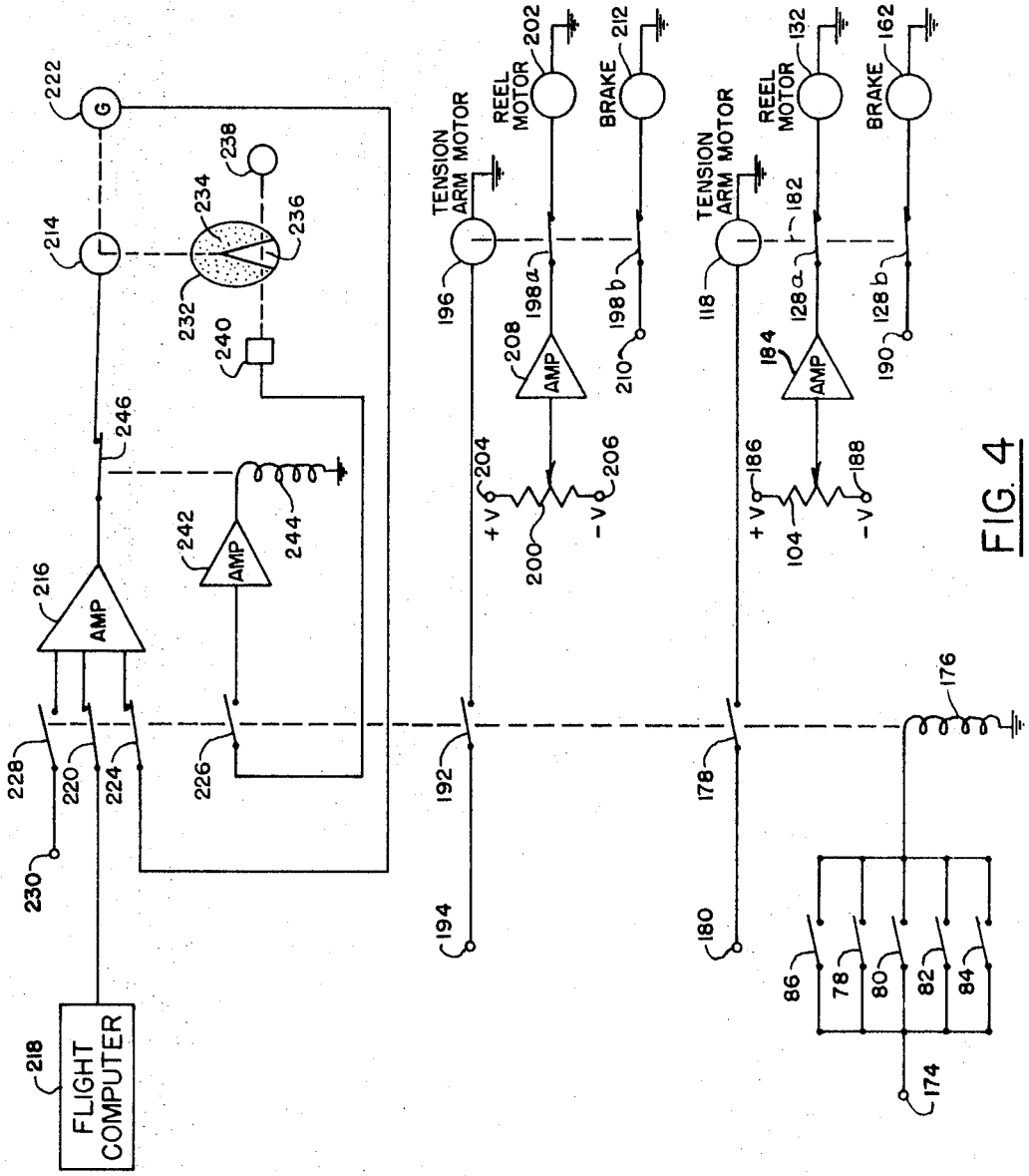

FIG. 3 is a plan view partially in section of the reel drive and brake system employed in the projector illustrated in FIG. 1; and FIG. 4 is a schematic diagram of the control circuit for the projector illustrated in FIG. 1.

Like reference numerals throughout the various views of the drawings are intended to designate the same or similar structures.

With reference to FIG. 1, there is shown a projector which includes a housing 10 containing the drive system and gear trains for the loading and threading apparatus mounted thereon. Only the outline of the housing 10 is shown in FIG. 1 for purposes of clarity. A supply reel 12 is mounted at the upper end of the housing 10 and a takeup reel 14 is mounted at the lower end thereof. A strip of film 16 is disposed for being supported on and transported over a sound track readhead 18 and through a film trap gate 20. An illumination source and a shutter (not shown) are positioned on one side of the film trap gate 20 (left side is shown in FIG. 1) to illuminate each frame of the film strip 16.

A film tensioning apparatus 22 is mounted on the housing 10 adjacent the supply reel 12 and a film tensioning apparatus 24 is mounted on the housing adjacent the takeup reel 14. Each of the film tensioning apparatus 22 and 24 maintain a predetermined tension in the filmstrip 16. The tensioning apparatus 22 includes an idler roller 26 which is mounted on a plate 28. The plate 28 is supported a spaced distance from the surface of the housing 10. A tensioning arm 30 supports a tensioning roller 32 at one end thereof which is moveable between two positions established by appropriate mechanical stops (not shown) on plate 28 as indicated by the solid line outline and the dotted line outline thereof shown in FIG. 1. The plate 28 is supported a spaced distance from a surface of the housing 10 and the tensioning arm 30 is moveable thereunder.

The drive system for the film 16 includes a pair of sprockets 34 and 36 mounted on opposite sides of the readhead 18. A pressure roller 38 associated with the sprocket 36 is mounted on an arm 40 and is moveable to the dotted line outline designated with the reference numeral 42.

An intermittent sprocket 44 is positioned immediately below the film trap gate 20 and is disposed for driving the film 16 in an intermittent fashion therethrough. The film drive system also includes a sprocket 46 having a pressure roller 48 associated therewith. An arm 50 supports the roller 48 and is disposed for movement to the position indicated by the dotted line outline designated with the reference numeral 52.

The tensioning apparatus 24 is similar to the tensioning apparatus 22 and includes an idler roller 54 mounted on a plate 56 which is supported a spaced distance from a surface of the housing 10. A tensioning arm 58 supports a tensioning roller 60 at one end thereof and is moveable to the position indicated by the dotted line outline thereof, similarly established by an appropriate mechanical stop, and designated with the reference numeral 61.

In addition to the film drive system and the tensioning apparatus, the projector includes the readhead 18 for sensing a signal on the sound track of the film 16 and the film trap gate 20 for positioning successive frames of the filmstrip 16 in the path of the light rays from the illumination source. Associated with the readhead 18 are a pair of arms 62 and 64 which are pivoted on a housing 66 and are each moveable to the dotted line outlines illustrated in FIG. 1. The arms 62 and 64 force the filmstrip 16 to wrap around the surface of the readhead 18 which contains the sensing element. A lever 68 is provided for positioning the arms 62 and 64 in their respective positions.

The film trap gate 20 includes a curved gate rail 70 which is moveable to a position indicated by the dotted line 72. A frame 74 supports a pair of pressure strips 76 thereon. The film strip 16 is engaged between the curved gate rails 70 and the pressure strips 76 and conforms to the outline of the curved gate rails while passing through the gate 20. A shoe 77 is mounted on the curved gate rails 70 and is moveable therewith to apply a pressure to the filmstrip passing over the intermittent sprocket 44.

Each of the elements are illustrated by the full line outline of each in the loading position and in the dotted line outline of each in the operating position. In the load position, the filmstrip 16 is taken from the supply reel 12 and placed between the idler roller 26 and the tensioning roller 32, over the sprocket 34, the readhead 18, the sprocket 36, the pressure roller 38 and between the frame 74 and the curved gate rail 70. Below the gate 20, the film is placed between the intermittent sprocket 44 and the show 78, over the idler roller 48, over the sprocket 46, between the idler roller 54, and the tensioning roller 60 and on to the takeup reel 14. Before operation can be initiated, the lever 68 must be actuated to release the arms 62 and 64 which are spring loaded to apply pressure to the filmstrip 16 to wrap the filmstrip around the sensing surface of the readhead 18. In addition, the pressure roller 38 and arm 40 are moved to the position indicated by the dotted line outline 42 permitting a loop of film to be formed between the sprocket 36 and the film trap gate 20. The curved gate rails 70 are released and are spring biased to apply pressure against the film and the pressure straps 76. With the release of the curved gate rails 70, the shoe 78 applied pressure against the film on the intermittent sprocket 44. The pressure roller 48 and arm 50 are moved to the position indicated by the dotted line outline 52, thereby forming a loop of film between the intermittent sprocket 44 and the sprocket 46.

The position of each of the elements which must be properly positioned before operation can be initiated is sensed by a switch. In particular, a switch 78 is positioned to be actuated by movement of the arm 62 from the "load" position to the "operating" position thereof. In addition, a switch 80 is positioned adjacent the arm 40, a switch 82 adjacent the curved gate rails 70 and a switch 84 adjacent the arm 50. As will be described hereinbelow, the switches 78, 80, 82 and 84 will not permit operation of the projector to be initiated unless the elements associated therewith are in the "operating" position. If each of the interlock switches indicates that the threading and loading apparatus has been prepared for operation of the projector to be initiated, a load-operate switch 86 (see FIG. 4) is actuated to engage the tensioning apparatus 22 and 24. As will be described in greater detail hereinbelow, actuation of the tensioning apparatus 22 and 24 causes the tensioning arms 30 and 62 to move from the position indicated by the full line outline to the position indicated by the dotted line outline thereof. The filmstrip 16 follows the movement of the arms 30 and 58 to form respective loops between the idler roller 26 and the sprocket 34 and between the idler roller 54 and the sprocket 46. When the tensioning arms 30 and 58 reach the position indicated by the dotted line outline of each, a switch is actuated to initiate operation of the tensioning operation.

Figure 2:
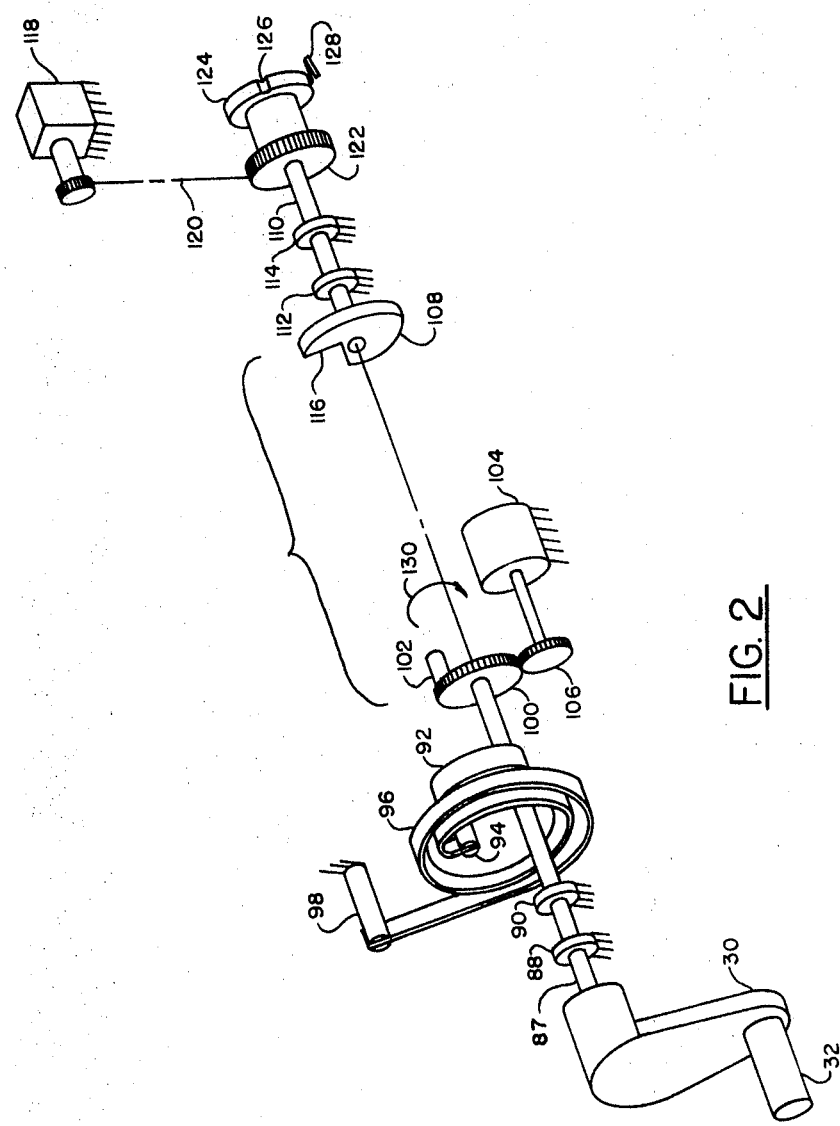

The tensioning apparatus 22 is illustrated in greater detail in FIG. 2. It is to be understood that the tensioning apparatus 24 is identical to the tensioning apparatus 22. As shown in FIG. 2, the tensioning arm 30 is supported for pivotal movement on the end of a shaft 87 which is journaled in the frame of the housing 10 by means of bearings 88 and 90. An arm 92 is mounted on the shaft 87 and supports a pin 94 at one end thereof which engages one end of a coil spring 96. The other end of the spring 96 is supported on a pin 98 which is mounted to the housing 10. A gear 100 is supported at the other end of the shaft 87 and is provided with a pin 102 extending from one surface thereof. A potentiometer 104 is mounted on the frame of the housing 10 and is driven from the gear 100 by means of a gear 106. The potentiometer 104 monitors the position of the tensioning arm 30. A disc 108 is mounted on one end of a shaft 110 which is journaled in the frame of the housing 10 by means of bearings 112 and 114. A portion of the disc 108 is undercut to provide a shoulder 116 which is engageable with the pin 102. A motor 118 is mounted on the frame of the housing 10 and is connected by means of a gear train 120 to a gear 122 mounted on the shaft 110. A cam 124 is mounted on the other end of the shaft and is provided with a circular peripheral surface having an indent 126 therein. The actuating arm of a switch 128 rides on the peripheral surface of the cam 124. The switch 128 is normally closed and is opened in response to rotation of the cam 124 to a position which permits the actuating arm of the switch 128 to be received within the indent 126.

In operation, the coil spring 96 biases the shaft 87 in a direction as indicated by the arrow designated with the reference numeral 130. The surface 116 of the disc 108 engages the pin 102 to rotate the shaft 86 in the opposite direction. As will be explained in greater detail hereinbelow, switch 86 is manually closed whereby the motor 118 is actuated to rotate the tensioning arm 30 to the position illustrated in FIG. 2 to permit loading of the filmstrip 16 onto the projector. Upon reopening of the load-operate switch, the motor 118 is deenergized and the coil spring 96 rotates the tensioning arm 30 to the position indicated by the dotted line in FIG. 1. At that position, the switch 128 is actuated to cause the tensioning operation to be initiated. The potentiometer 104 senses the position of the tensioning arm 30 and supplied a signal to control the motor which drives the supply reel 12.

The supply reels 12 and 14 are driven by separate motors which are controlled by respective tensioning apparatus 22 and 24. In addition, a brake is provided on each of the shafts which support and drive the reels 12 and 14. FIG. 3 illustrates the motor and brake arrangement which is employed for controlling each of the reels 12 and 14. As shown in FIG. 3, a constant torque DC motor 132 is mounted on the frame of the housing 10 by means of a bracket 134. The shaft of the motor 132 is connected to a reel shaft 136 through a coupling 138. A brake 140 is mounted on the frame of the housing 10 by means of a plate 142 and the shaft 136 passes therethrough. An arm 144 is provided with a pin 146 and is mounted on the shaft 136 for engaging and driving the reel mounted thereon. A spring loaded knob 148 is provided at the end of the shaft 136 and is moveable to lock the respective reel thereon.

The brake 140 is formed of a stator portion including a housing 150 and a base 152 secured to the frame of the projector housing 10 by means of a plate 142 and a rotor portion 156 secured to the shaft 136. An armature 158 is mounted on pins 160 for axial movement with respect to the base 152. A coil 162 is provided in the base 152. A spring 164 is provided between the base 152 and the armature 158. The rotor portion 156 of the brake is formed of a hub 166 which supports a diaphragm 168 thereon. A pair of shoes 170 and 172 are supported on the peripheral edge of the diaphragm 168.

When the coil 162 is not energized, the spring 164 biases the armature 158 outwardly from the base 152 and engages the brake shoes 170 and 172 between a surface thereof and a flange of the housing 150. When the coil 162 is energized, the armature 158 is drawn toward the base 152 releasing the shoes 170 and 172 from frictional engagement with the surface thereof and the flange of the housing 150. The hub 166 is keyed to the shaft 136 such that frictional engagement of the brake shoes between the surface of the armature 158 and the flange of the housing 150 will place a drag on the rotation of the shaft 136.

A schematic diagram of the control circuit is illustrated in FIG. 4. As shown therein, the load-operate switch 86 is connected in parallel with each of the interlock switches 78, 80, 82 and 84 between a source of voltage on a terminal 174 and the coil of a relay 176. A switch contact 178 of the relay 176 is connected between a source of voltage on a terminal 180 and the tension arm motor 118.

As shown in FIG. 2, the tension arm motor 118 is mechanically connected to the switch 128. Such mechanical connection is diagrammatically illustrated by the dashed line indicated with the reference numeral 182. The switch 128 includes a pair of contacts 128a and 128b. The switch 128a is connected between an amplifier 184 and the reel motor 132 (se FIG. 3). The potentiometer 104 illustrated in FIG. 2 is connected between a source of positive voltage on a terminal 186 and a source of negative voltage on a terminal 188. The moveable contact arm of the potentiometer 104 is connected to an input of the amplifier 184.

The switch contact 128b is connected between a source of voltage on a terminal 190 and the brake coil 162 (see FIG. 3).

Relay 176 is also provided with a switch contact 192 which is connected between a source of voltage on a terminal 194 and a tension arm motor 196. The tension arm motor 196 drives an arrangement identical to that illustrated in FIG. 2 connected to the tensioning arm 58. The tension arm motor 196 is connected mechanically to a pair of switches 198 a and 198 b and are actuated in the same manner as is the switch 128 illustrated in FIG. 2. The moveable contact arm of a potentiometer 200 is mechanically connected to the tensioning arm 58 to provide a position feedback to a reel motor 202 which drives the reel 14. The potentiometer 200 is connected between a source of positive voltage on a terminal 204 and a source of negative voltage on a terminal 206. The moveable contact arm of the potentiometer 200 is connected through an amplifier 208 and through the switch contact 198a to the reel motor 202. A source of voltage on a terminal 210 is connected through the switch contact 198b to a brake coil 212 which is mounted on the output shaft of the reel motor 202 and forms an identical arrangement as that illustrated in FIG. 3.

The intermittent sprocket 44 illustrated in FIG. 1 is connected through a geneva drive to a motor 214, which motor is also connected through suitable gear trains to the sprockets illustrated in FIG. 1. The motor 214 is energized from the output of an amplifier 216 which is provided with a plurality of inputs. A flight computer 218 provides a drive signal for the motor w14 to the amplifier 216 through a switch contact 220 of the relay 176. Although the projector of the present invention may receive drive signals from any appropriate source, since development thereof was undertaken primarily to provide an expedient loading, tensioning and framing system for use on visual display systems of training devices, the illustrated embodiment is shown as receiving drive signals from a flight computer, as is common in such applications. For example, U.S. Pat. Nos. 3,233,508 and 3,261,912, among others, illustrate in detail the use of flight computing apparatus such as that commonly in current use in conjunction with aircraft simulators for driving film projectors of visual systems associated with such simulators. A feedback is provided by means of a tachometer-generator 222 connected mechanically to the shaft of the motor 214 and electrically to another input of the amplifier 216 through a switch contact 224 of the relay 176. The switch contacts 220 and 224 are normally closed such that signals from the flight computer 218 drive the motor 214 accordingly.

The relay 176 also includes a pair of normally open switch contacts 226 and 228. The switch contact 228 is connected between a source of voltage on the terminal 230 and another input to the amplifier 216. A disc 232 is mounted on an output shaft of the motor 214 and includes an opaque portion 234 and a transparent portion 236. An illumination source 238 is disposed adjacent the disc 232 and illuminates one surface thereof. A photodetector 240 is mounted on the opposite side of the disc 232 and provides a voltage output when the transparent portion 236 is disposed between itself and the illumination source 238. The photosensor 240 is connected through the switch contact 226 to an amplifier 242 having an output connected to a relay 244. A switch contact 246 of the relay 244 is connected between an output of the amplifier 216 and the motor 214.

During operation, the switch contacts 78, 80, 82, 84 and 86 are open and the relay 176 is deenergized. The tension arm motors 118 and 196 are deenergized, thereby energizing the reel motors 132 and 202 and the brake coils 162 and 212, since switches 128 and 198 are closed prior to energization of motors 118 and 196. Without any drive signals supplied to the film drive mechanism by the flight computer 218, the reel motors 132 and 202 will remain stationary, but will maintain proper tension in the film in accordance with the position of the moveable contact arms of the potentiometers 104 and 200. Because the brake coils 162 and 212 are energized, the brake 140 will be disengaged thereby permitting the reel motors 132 and 202 to pay out the proper amount of film which, in combination with the pressure provided on the film by arms 30 and 58, will maintain the film properly tensioned. If a signal is supplied from the flight computer 218 to the amplifier 216, the drive motor 214 will be actuated and will rotate at a speed corresponding to the signals supplied thereto.

If one of the switches 78, 80, 82, 84 or 86 is closed, the relay 176 will be energized closing the contacts 178 and 192. Under such conditions, the tension arm motors 118 and 196 will be actuated to drive the tensioning arms 30 and 58 to the "load" position. In addition, the switch contacts 128a, 128b, 198a and 198b will be open to deenergize the reel motors 132 and 202 and to deenergize the brake coils 162 and 212. Upon deenergization of the brake coils 162 and 212, the respective brakes will place a drag on the reel shafts. When the relay 176 is energized, the switch contacts 220 and 224 will be open to disengage the flight computer 218 from the amplifier 216 and the feedback provided by the tachometer-generator 222 from the amplifier 216. In addition, the switch contacts 226 and 228 will close causing a constant amplitude voltage to be applied to an input of the amplifier 216. If the photosensor 240 does not sense any light thereon from the illumination source 238, the relay 244 will remain deenergized, causing the switch contact 246 to remain closed. As a result, the motor 214 will be energized in accordance with the amplitude of the voltage on the terminal 230 and will rotate the disc 232 until light rays from the illumination source 238 pass through the transparent portion 236 and illuminate the photosensor 240. The signal from the photosensor 240 will be amplified by the amplifier 242 to actuate the relay 244 and open the contact 246, thereby deenergizing the motor 214. When the disc 232 is positioned such that the transparent portion 236 is interposed between the illumination source 238 and the photosensor 240, the shutter (not shown) of the projector and the intermittent sprocket 44 will be positioned to permit proper framing of the film 16 in the film trap gate 20. That is, in such position the operator can observe the film 16 through the shutter and can position one full frame with the aperture of the film trap gate 20. If the film 16 is framed in this manner within the film trap gate 20, subsequent operation of the projector will not require further "framing" adjustment of the film.

If any of the interlock switches 78, 80, 82 or 84 are not open prior to initiation of the operation of the projector, the relay 176 will be energized, thereby maintaining the drive motor 214 inoperative and the brakes on the reel shaft operative. It can also be appreciated that if the projector is operating and a power failure should occur, the brakes on the reel shafts will engage simultaneously with the loss of power to the drive motor 214.

The threading and loading arrangement illustrated in FIG. 1 is extremely simplified over that of presently known projectors. Therefore, a semiskilled operator can thread and load the projector. Because of the interlock switches, there is little possibility of any damage occuring to the film due to operator error.

The prinicples of the present invention explained in connection with the specific exemplification thereof will suggest many other applications and modifications of the same. It is accordingly desired that, in construing the breadth of the appended claims, they shall not be limited to the specific details shown and described in connection with the disclosed exemplification thereof.

What I claim is:

1. A motion pitcure film transport, comprising:
   a. a film trap gate positioned between a supply reel and a takeup reel,
   b. a pair of film tensioning apparatus disposed on opposite sides of said gate,
   c. a first sprocket mounted between one tensioning apparatus and one side of said gate,
   d. a second sprocket mounted between the other of said tensioning apparatus and the other side of said gate, each of said tensioning apparatus including an idler roller, a tensioning roller, and a tensioning arm mounted for pivot movement on a shaft at one end thereof and and supporting said tensioning roller on the other end thereof, said tensioning roller being engageable with the film, means for biasing said tensioning arm in a direction to force the film to form a loop from said roller and a respective one of said sprockets over said tensioning roller, and means for rotating said tensioning arm against the bias of said biasing means to a position in which the film can be loaded from the supply reel to a respective one of said sprockets in a substantially straight line path.

2. A motion picture film transport, comprising:
   a. a film trap gate positioned between a supply reel and a takeup reel;
   b. a first sprocket arrangement for forming a loop in the film on one side of said gate;
   c. a second sprocket arrangement for forming a loop in the film on the other side of said gate;
   d. a motor having an output shaft connected to one of said reels
   e. said film trap gate including an element which is movable from a closed position to an open position to accept the film therein;
   f. means for sensing the position of said element for controlling said motor; and
   g. a brake mounted on said output shaft, said sensing means being disposed for controlling said brake.

3. A motor picture film transport, comprising:
   a. a film trap gate positioned between a supply reel and a takeup reel;
   b. a first sprocket arrangement for forming a loop in the film on one side of said gate;
   c. a second sprocket arrangement for forming a loop in the film on the other side of said gate;
   d. a motor having an output shaft connected to one of said reels;
   e. one of said sprocket arrangement including an element which is movable from a closed position to an open position to accept the film therein;
   f. means for sensing the position of said element for controlling said motor; and
   g. a brake mounted on said output shaft, said sensing means being for controlling said brake.

4. A motion picture film transport, comprising:
   a. a film trap gate positioned between a supply reel and a takeup reel;
   b. a first sprocket arrangement for forming a loop in the film on one side of said gate;
   c. a second sprocket arrangement for forming a loop in the film on the other side of said gate;
   d. first means for supporting the film between said first sprocket arrangement and the supply reel;
   e. second means for supporting the film between said sprocket arrangement and the takeup reel; and
   f. third means for displacing said first and second means to a position which is substantially in a straight line between the supply reel and said first sprocket arrangement and between said second sprocket arrangement and the takeup reel respectively.

5. A motion picture film transport as defined in claim 4 wherein said first and said second means each includes a tensioning roller engageable with the film and a tensioning arm supporting a respective one of said rollers.